United States Patent
Hara (10) Patent No.: US 7,710,839 B2
(45) Date of Patent: May 4, 2010

(54) INFORMATION PROCESSING APPARATUS AND CONTROL METHOD THEREFOR

(75) Inventor: Kenji Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 11/762,613

(22) Filed: Jun. 13, 2007

(65) Prior Publication Data
US 2008/0008073 A1    Jan. 10, 2008

(30) Foreign Application Priority Data
Jun. 23, 2006   (JP) ............................ 2006-173621

(51) Int. Cl.
*G11B 5/09* (2006.01)
(52) U.S. Cl. .................... 369/47.1; 369/53.45; 369/59.1
(58) Field of Classification Search ........................ None
See application file for complete search history.

(56) References Cited

U.S. PATENT DOCUMENTS 5,917,785 A *  6/1999  Masaki et al. ............ 369/44.27
6,438,083 B1 *  8/2002  Kroon ........................ 369/47.3

FOREIGN PATENT DOCUMENTS

JP          8-179937 A       7/1996

* cited by examiner

*Primary Examiner*—Muhammad N. Edun
(74) *Attorney, Agent, or Firm*—Canon U.S.A., Inc., IP Division (57) ABSTRACT

An information processing apparatus and method for controlling the information processing apparatus where the information processing apparatus stores a plurality of start programs in a first or second storage area, and if a selected start program is not already stored in the first storage area, the start program is transferred from the second storage area to the first storage area.

15 Claims, 7 Drawing Sheets

| FILE NAME | FIRST FILE NAME |
|---|---|
| SIZE (BYTE) | 3563 |
| CREATION DATE | JANUARY 1, 2001 |
| CLUSTER NUMBER | 08 |

FIG. 4B

| FILE NAME | SECOND FILE NAME |
|---|---|
| SIZE (BYTE) | 16388 |
| CREATION DATE | FEBRUARY 2, 2001 |
| CLUSTER NUMBER | 05 |

FIG. 5

| CLUSTER NUMBER | DATA | | | | | | | | |
|---|---|---|---|---|---|---|---|---|---|
| S0000 | 00 | 00 | 00 | 00 | - | 00 | 00 | 00 | 00 |
| S0001 | 58 | 59 | 60 | 61 | - | 62 | 63 | 64 | 65 |
| S0002 | 66 | 67 | 68 | 69 | - | 70 | 71 | 72 | 73 |
| S0003 | 00 | 00 | 00 | 00 | - | 00 | 00 | 00 | 00 |
| S0004 | 00 | 00 | 00 | 00 | - | 00 | 00 | 00 | 00 |
| S0005 | 50 | 51 | 52 | 53 | - | 54 | 55 | 56 | 57 |
| S0006 | 74 | 75 | 76 | 77 | - | 78 | 79 | 80 | 81 |
| S0007 | 82 | 1A | 00 | 00 | - | 00 | 00 | 00 | 00 |
| S0008 | 10 | 11 | 12 | 13 | - | 14 | 15 | 16 | 17 |
| S0009 | 18 | 19 | 20 | 21 | - | 22 | 23 | 24 | 25 |
| S0010 | 26 | 27 | 28 | 29 | - | 30 | 31 | 32 | 33 |
| S0011 | 34 | 35 | 36 | 37 | - | 00 | 00 | 00 | 00 |
| S0012 | 00 | 00 | 00 | 00 | - | 00 | 00 | 00 | 00 |
| S0013 | 00 | 00 | 00 | 00 | - | 00 | 00 | 00 | 00 |
| S0014 | 00 | 00 | 00 | 00 | - | 00 | 00 | 00 | 00 |
| S0015 | 00 | 00 | 00 | 00 | - | 00 | 00 | 00 | 00 |
| ... | . | . | . | . | - | . | . | . | . |
| S0064 | 00 | 00 | 00 | 00 | - | 00 | 00 | 00 | 00 |

INFORMATION PROCESSING APPARATUS AND CONTROL METHOD THEREFOR

BACKGROUND OF THE INVENTION

1. Field of the Invention

The present invention relates to an information processing apparatus and a control method therefor.

2. Description of the Related Art

A technique for executing a start program for starting (initializing) a device from a non-operating state to an operating state is known. A device including a plurality of types of start programs and selecting and executing one of the plurality of start programs is also known (for example, see Japanese Patent Laid-Open No. 8-179937).

In the device disclosed in the above publication, a plurality of types of start programs are stored in a plurality of read only memories (ROMs), and a start program is read out from one of the ROMs and is executed. However, providing a plurality of ROMs for storing the plurality of types of start programs is expensive, and also, a complicated and troublesome operation is necessary for exchanging start programs.

Accordingly, instead of using ROMs, large-capacity storage units, for example, hard disks, may be used for storing a plurality of start programs. In large-capacity storage units, however, the data read/write speed may be different depending on the storage areas, which may hamper the fast readout of start programs. With respect to hard disks, for example, it is known that the data read/write speed is lower at the inner area than at the outer area. In order to read out start programs from large-capacity storage units at high speed, the start programs should be stored in areas where the readout speed is high (i.e., the outer areas of a hard disk). If, however, all types of start programs are stored in areas where the readout speed is high, data other than the start programs should be stored in areas where the readout speed is low.

SUMMARY OF THE INVENTION

The present invention provides an improved information processing apparatus and a control method therefor.

In one aspect of the present invention, an information processing apparatus includes a first storage unit configured to include a first storage area and a second storage area and to store a plurality of types of start programs in the first storage area or the second storage area for shifting the information processing apparatus from a non-operating state to an operating state, a second storage unit configured to receive a start program stored in the first storage area from the first storage unit and to store the received start program in the second storage unit, an executing unit configured to execute the start program stored in the second storage unit, a start program selecting unit configured to select a start program from among the plurality of types of start programs, and a controlling unit configured to control the first storage unit to store, in the first storage area, a start program selected by the start program selecting unit from among the plurality of types of start programs stored in the second storage area.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

DESCRIPTION OF THE EMBODIMENTS

The present invention will now be described in detail with reference to the drawings showing various embodiments thereof. In the drawings, elements and parts which are identical throughout the views are designated by identical reference numerals, and a duplicate description thereof is omitted.

Exemplary embodiments of the present invention are described in detail below with reference to the accompanying drawings.

Figure 1:
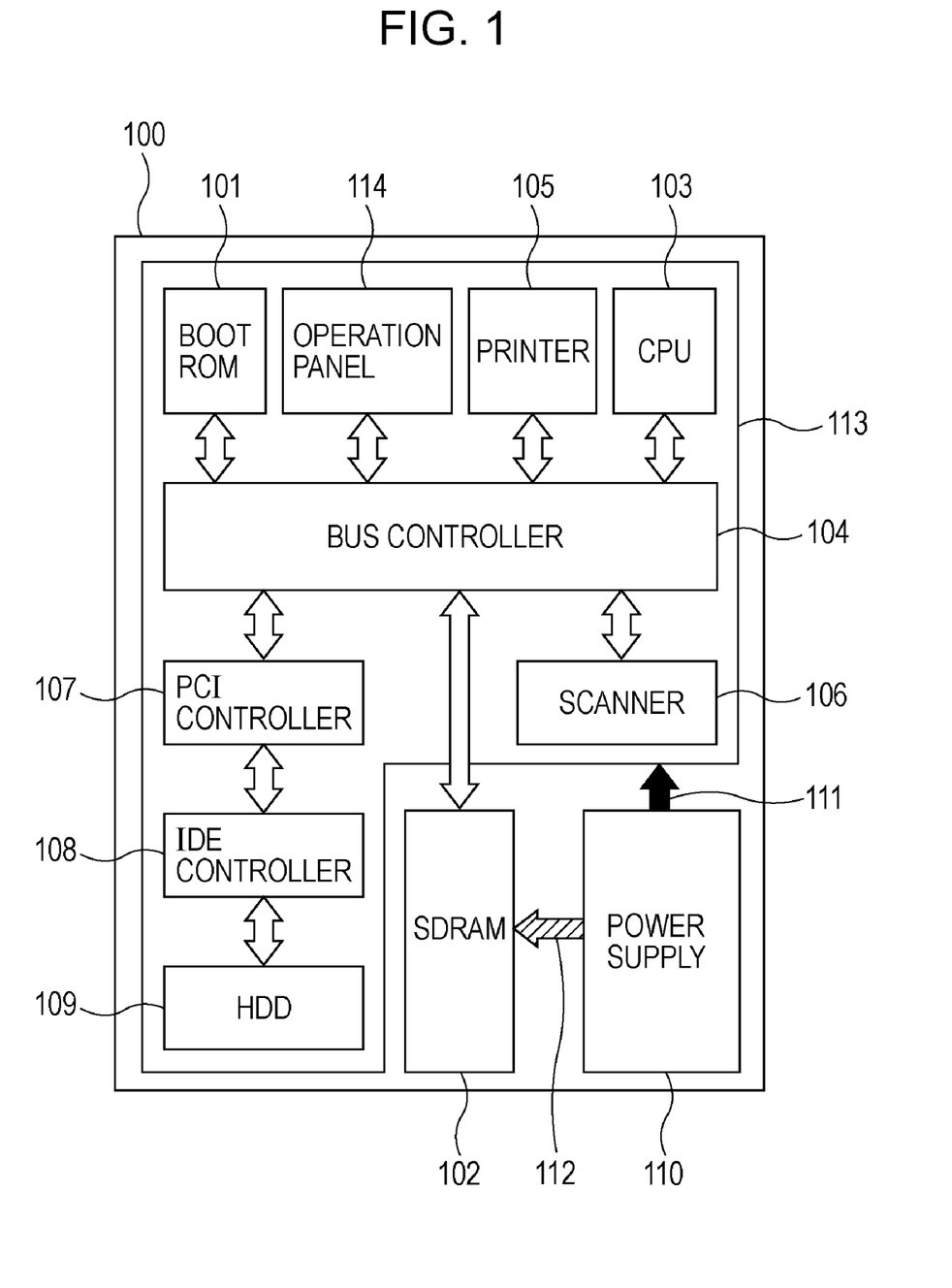
FIG. 1 is a block diagram illustrating the control structure of a printing apparatus.

FIG. 1 is a block diagram illustrating the configuration of a printing apparatus 100 according to a first exemplary embodiment of the present invention.

In FIG. 1, a scanner 106 optically reads a plurality of original documents (e.g. sheets, such as paper, on which images are printed) to generate image data, and performs image processing, for example, shading correction processing, on the read image data. The scanner 106 then stores the plurality of pages of image data subjected to image processing in a hard disk (HDD) 109 as one print job.

A printer 105 prints the print job stored in the HDD 109. Since a print job can include a plurality of pages, the plurality of pages of image data is printed on the corresponding sheets.

A central processing unit (CPU) 103 writes a program read from a BOOT ROM 101 or the HDD 109 into a synchronous dynamic random access memory (SRAM) 102, and executes the program by using the SDRAM 102, thereby controlling the entirety of the printing apparatus 100.

The HDD 109 is connected to a peripheral component interconnect (PCI) bus on a bus controller 104 with a PCI controller 107 therebetween. An integrated device electronics (IDE) controller 108 serves as a controller that controls data to be output from the HDD 109 to the PCI bus or to be input from the PCI bus to the HDD 109.

An operation panel 114 is used for an operator to set printing conditions, such as the number of copies, the size of paper, information whether single-sided printing or duplex-sided printing is performed, etc., for performing printing processing using the printer 105 or the scanner 106. The CPU 103 interprets the printing conditions input via the operation panel 114 and controls the printer 105 or the scanner 106 to perform printing processing in accordance with the specified printing conditions.

The bus controller 104 is connected to the BOOT ROM 101, the SDRAM 102, the CPU 103, the PCI controller 107, the printer 105, the scanner 106, and the operation panel 114. The bus controller 104 serves as a bus bridge, which controls sending and receiving of data among the elements forming the printing apparatus 100.

The printing apparatus 100 includes a power supply 110 that supplies power to a function unit 113, which includes all of the above-described units except for the SDRAM 102, and the SDRAM 102 by using different sources. The power supply 110 supplies power to the function unit 113 via a power source 111 and also supplies power to the SDRAM 102 via a power source 112. When the printing apparatus 100 is not operated over a certain period of time, for example, when the scanner 106 or the printer 105 is not operated over a certain period of time, the CPU 103 shifts the printing apparatus 100 to a power saving mode. When the CPU 103 determines that the printing apparatus 100 is to be shifted to the power saving mode, the CPU 103 stops power supply to the function unit 113 via the power source 111. On the other hand, the CPU 103 does not stop power supply to the SDRAM 102 via the power source 112.

Figure 2:
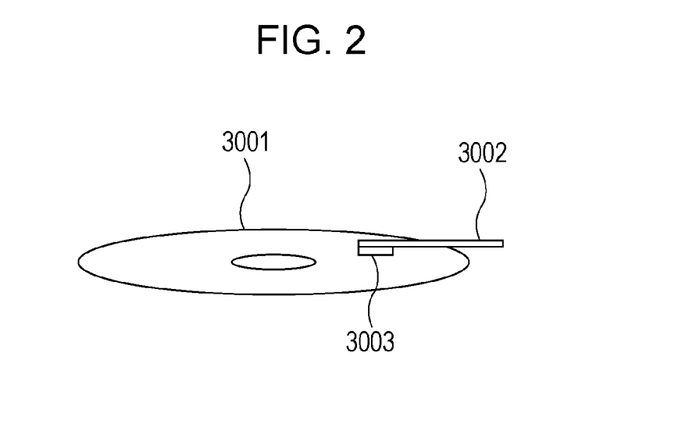
FIG. 2 illustrates the hardware configuration of a hard disk (HDD).

The hardware configuration of the HDD 109 is discussed below with reference to FIG. 2. In FIG. 2, the HDD 109 includes a disk 3001, which is a magnetic recording material, a head 3003 for reading and writing data from and to the disk 3001, and an arm 3002 for moving the head 3003 to a certain position. The disk 3001 is controlled by a motor (not shown) such that it is rotated at a certain speed. By moving the head 3003 to a certain position on the disk 3001 which is rotating at a certain speed, data can be read or written from or to concentric areas of the disk 3001.

Figure 3:
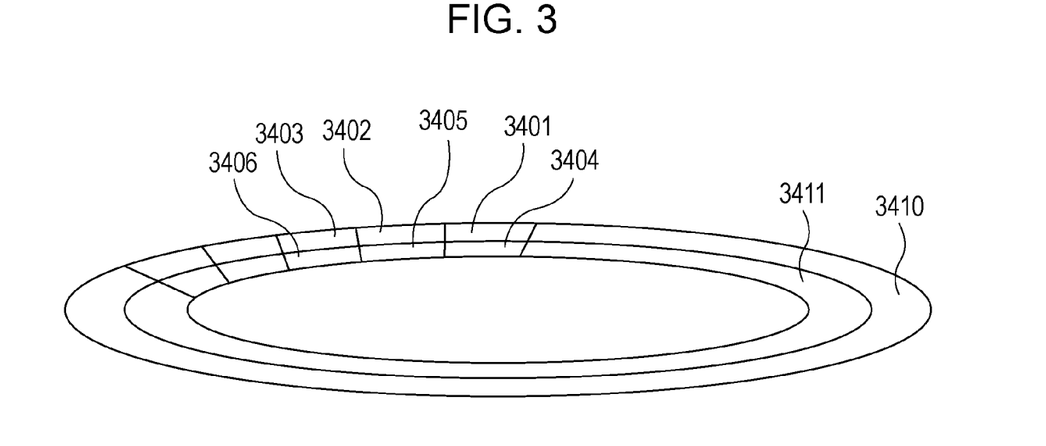
FIG. 3 illustrates a data management technique in an HDD.

A management technique for reading or writing data in the HDD 109 is discussed below with reference to FIG. 3.

In a storage medium using a disk, data is concentrically divided and recorded. Concentric areas divided along the circumferences of a disk are referred to as "tracks". In FIG. 3, portions represented by 3410 and 3411 are tracks. Portions equally divided from a track in the radial direction are referred to as "sectors", which serve as the minimum recording unit, for example, 512 bytes, in a disk-shaped recording medium. In FIG. 3, portions indicated by 3401 through 3403 are sectors divided from the track 3410, and portions indicated by 3404 through 3406 are sectors divided from the track 3411.

When reading out data from the SDRAM 102 to the HDD 109 or from the HDD 109 to the SDRAM 102, the CPU 103 provides a sector number to specify an area in which the data is to be stored. Then, the CPU 103 informs the IDE controller 108 of the sector number and controls the IDE controller 108 to write the data received from the SDRAM 102 into the specified sector. A set of a plurality of sectors is referred to as a "cluster". When sending or receiving data to or from the HDD 109, the CPU 103 may specify a cluster number instead of a sector number. In the following description, it is assumed that the CPU 103 specifies a cluster number and the IDE controller 108 reads or writes data from or to a plurality of sectors forming the cluster represented by the specified cluster number. The relationship between the sector numbers and the cluster numbers is stored in the HDD 109 beforehand.

Figure 4A:
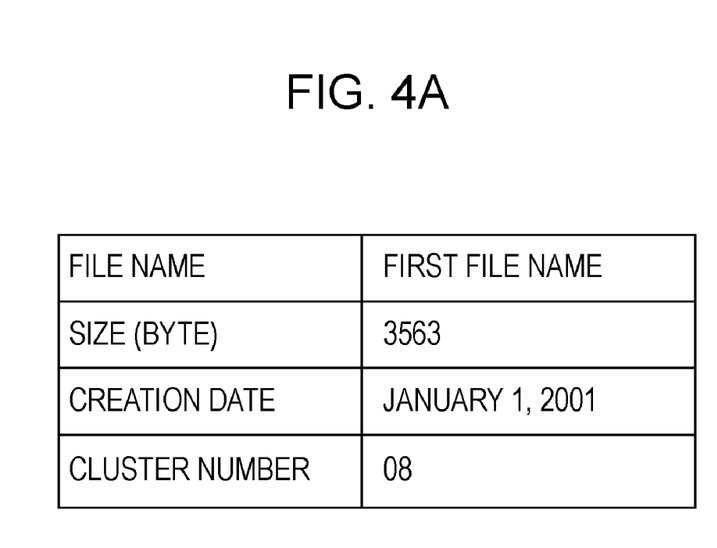
FIGS. 4A and 4B illustrate file management tables.
Figure 4B:
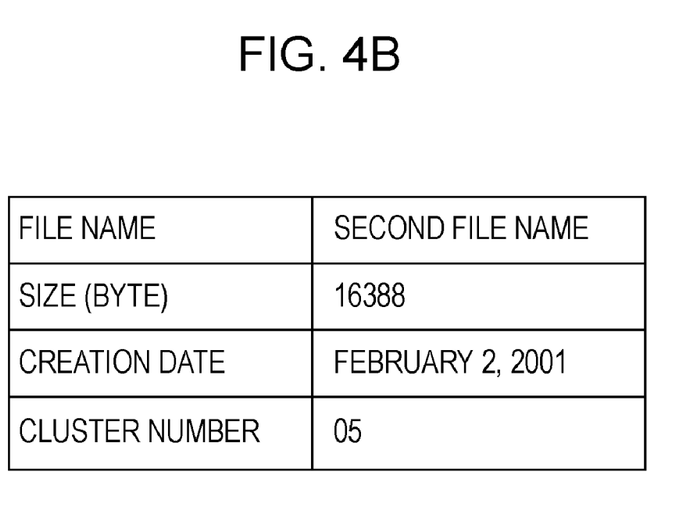

The CPU 103 performs data management in the HDD 109 in units of files by using the file management tables illustrated in FIGS. 4A and 4B. A system that handles data in units of files is referred to as a "file system". FIGS. 4A and 4B illustrate file management tables created by a file system when two files are managed. Although in this example two files are managed, the number of files managed by the file system is arbitrary.

The tables illustrated in FIGS. 4A and 4B are tables for managing two files, i.e., a file referred to as the "first file name" and a file referred to as the "second file name". The tables each indicate the file name, the size, the date when the file was created, and the cluster number. As stated above, the cluster number represents the number of a cluster including a set of a plurality of sectors, and indicates the position at which the corresponding file is read out from the HDD 109. For example, concerning the file named the "first file name", data forming the file is stored starting from the cluster number 08. Concerning the file named "second file name", data forming the file is stored starting from the cluster number 05.

Figure 5:
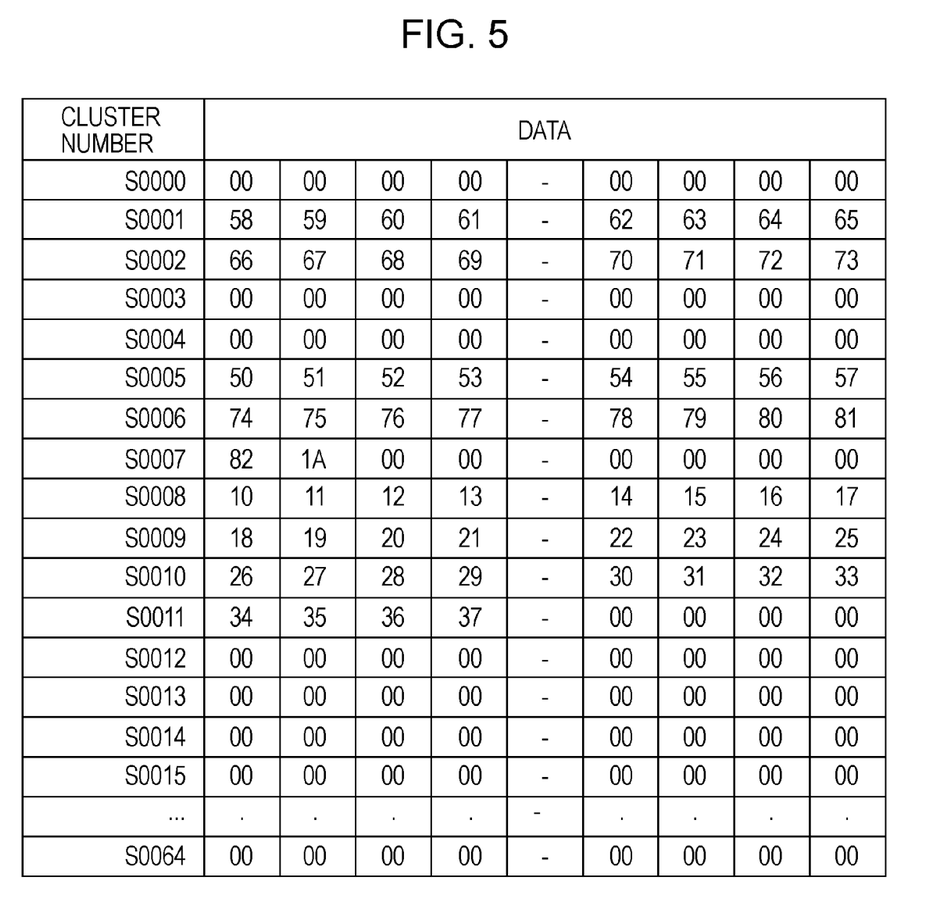
FIG. 5 illustrates an example of data stored in each cluster.

Each cluster is formed of 8 sectors. If each sector has 512 bytes, the data size of each cluster is 4 Kbytes (KB). FIG. 5 illustrates an example of data stored in each cluster.

The execution of a start program by the CPU 103 for shifting the printing apparatus 100 from the non-operating state to the operating state is described below. The HDD 109 stores a plurality of start programs.

When the printing apparatus 100 is powered ON, the CPU 103 of the printing apparatus 100 executes one of the start programs for shifting the printing apparatus 100 from the non-operating state to the operating state. The CPU 103 executes the start program to initialize the elements forming the printing apparatus 100, including the printer 105 and the scanner 106

Before executing the start program, the CPU 103 reads out the start program from the HDD 109 and expands it onto the SDRAM 102. To read the start program from the HDD 109, it is necessary that the HDD 109 be initialized. Then, before reading the start program from the HDD 109, the CPU 103 reads out a boot program stored in the BOOT ROM 101 to the SDRAM 102 and executes the read boot program. Then, the CPU 103 reads the start program from the HDD 109 by using this boot program.

The HDD 109 stores a plurality of types of start programs so that the data sizes of programs that can be executed vary depending on the capacity of the SDRAM 102 of the printing apparatus 100. In the printing apparatus 100 of the present embodiment, memory devices having different capacities can be exchanged for each other as the SDRAM 102. Accordingly, a plurality of types of start programs associated with possible capacities of the SDRAM 102 are stored in the HDD 109 beforehand. Then, a suitable start program is selected and executed in accordance with the capacity of the SDRAM 102.

Figure 6:
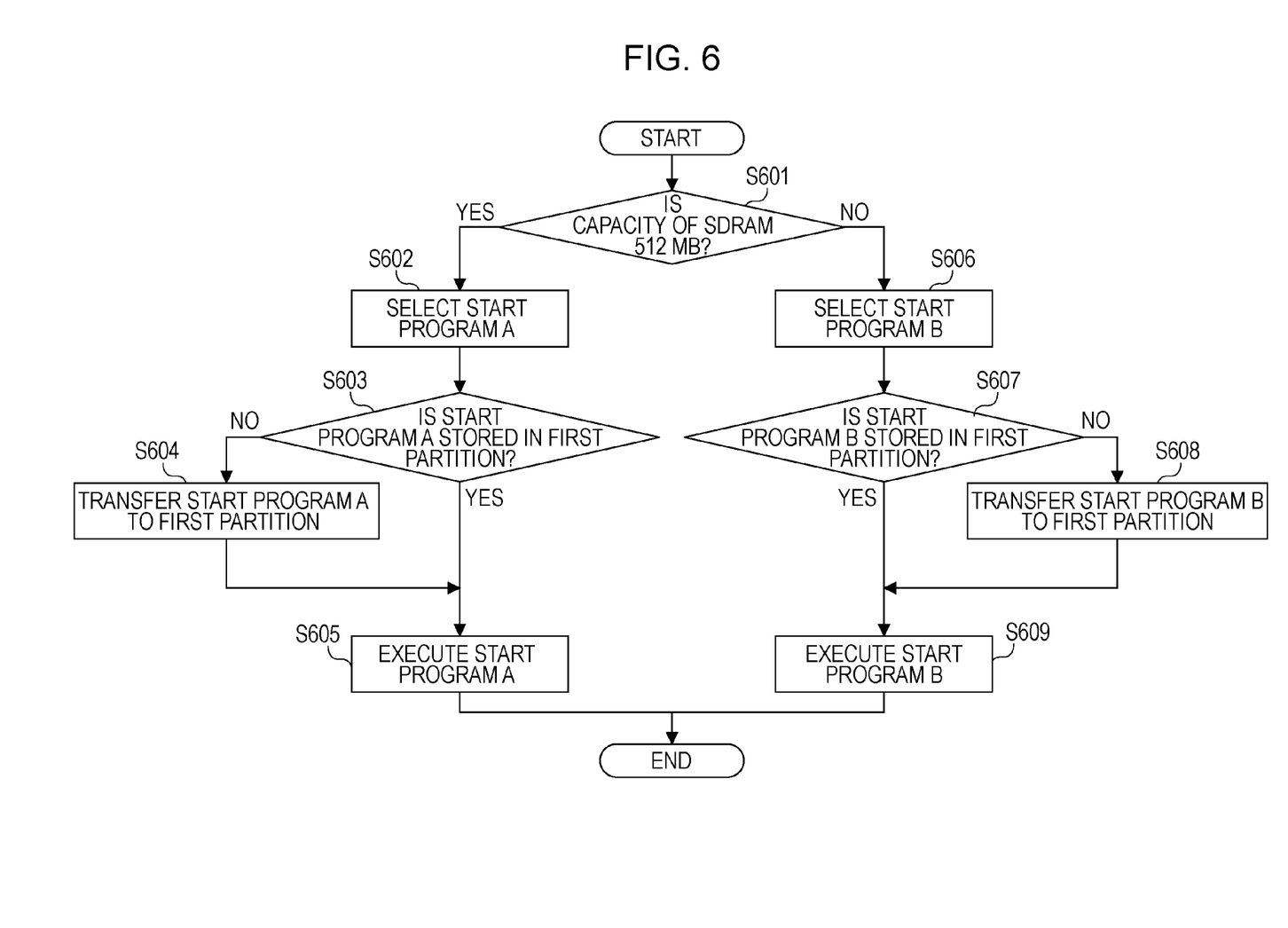
FIG. 6 is a flowchart illustrating an operation for selecting one of a plurality of types of start programs.

A method for selecting one of a plurality of start programs stored in the HDD 109 is described below with reference to FIGS. 6 and 7. The processing indicated by the flowchart in FIG. 6 is started when the CPU 103 reads the boot program stored in the BOOTROM 101 into the SDRAM 102. The storage condition of a plurality of types of start programs in the HDD 109 is discussed below with reference to FIG. 7.

Figure 7:
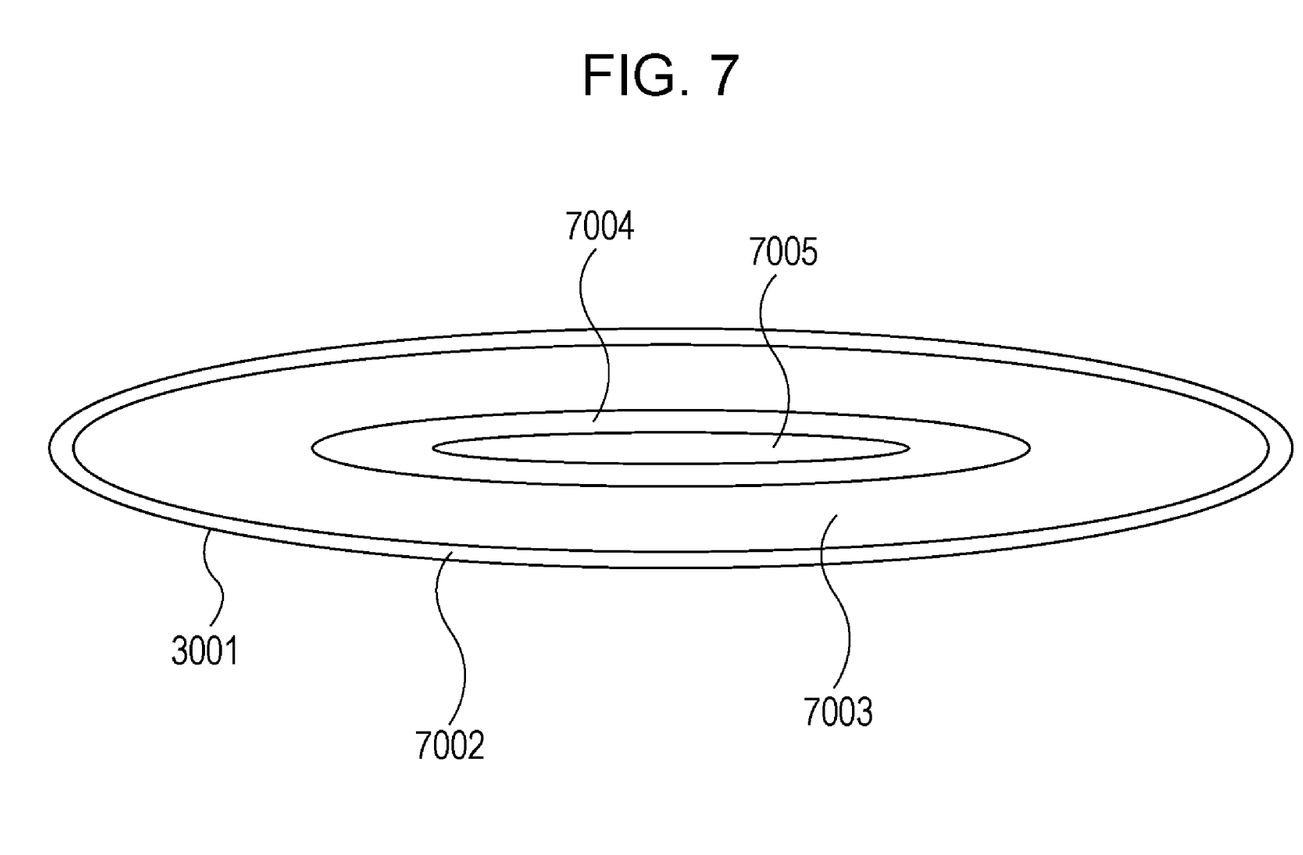
FIG. 7 illustrates a storage area of a disk of an HDD.

First, turning to FIG. 7, FIG. 7 illustrates the storage area of the disk 3001 of the HDD 109 illustrated in FIG. 2. The storage area illustrated in FIG. 7 includes four partitions, a first partition 7002, a second partition 7003, a third partition 7004, and a fourth partition 7005. The first partition 7002 is located at the outermost position of the disk 3001, the second partition 7003 is located further inward than the first partition 7002, the third partition 7004 is located further inward than the second partition 7003, and the fourth partition 7005 is located further inward than the third partition 7004.

Since the disk 3001 is rotated about its center at a constant speed, the moving speed of the disk 3001 with respect to the head 3003 is higher toward the outer portion. That is, with respect to the partitions, the data read/write speed of the head 3003 is higher with respect to the partitions near the outer portion of the disk 3001 than the partitions near the inner portion of the disk 3001. For example, the average data read/write speed in the first partition 7002 is about 25 MB, while the average data read/write speed in the fourth partition 7005 is about 15 MB.

After the printing apparatus 100 is powered ON, in order for it to shift from the non-operating state to the operating state, fast reading of the start program from the HDD 109 to the SDRAM 102 is needed. In order to accomplish the fast reading, the start program is stored in the first partition 7002 located at the outermost area of the HDD 109. Typically though, since the data read/write speed is the highest in the first partition 7002, the first partition 7002 is utilized to store data other than the start programs, such as image data. In this case, the start programs can be stored in the fourth partition 7005, and then transferred to the first partition 7002 as needed.

Turning to FIG. 6, in step S601, the CPU 103 communicates with the SDRAM 102 connected to the CPU 103 via the bus controller 104 and obtains information concerning the maximum capacity of the SDRAM 102, i.e., the amount of data that can be stored in the SDRAM 102. Then, the CPU 103 determines whether the capacity of the SDRAM 102 is 512 MB. If the maximum capacity of the SDRAM 102 is determined to be 512 MB, the process proceeds to step S602. If it is determined that the maximum capacity of the SDRAM 102 is not 512 MB, the process proceeds to step S606.

In step S602, the CPU 103 selects a start program A. In step S606, the CPU 103 selects a start program B.

In step S603, the CPU 103 determines whether the start program A selected in step 602 is stored in the first partition 7002. If the start program A is stored in the first partition 7002, the flow proceeds to step S605. If the start program A is not stored in the first partition 7002, the flow proceeds to step S604.

In step S604, the CPU 103 transfers the start program A stored in the fourth partition 7005 to the first partition 7002. In step S605, the CPU 103 executes the start program A stored in the first partition 7002 to shift the printing apparatus 100 from the non-operating state to the operating state.

In step S607, the CPU 103 determines whether the start program B selected in step S606 is stored in the first partition 7002. If the start program B is stored in the first partition 7002, the flow proceeds to step S609. If the start program B is not stored in the first partition 7002, the flow proceeds to step S608.

In step S608, the CPU 103 determines that the start program B is not stored in the first partition 7002, and thus transfers the start program B stored in the fourth partition 7005 to the first partition 7002. In step S609, the CPU 103 executes the start program B stored in the first partition 7002 of the HDD 109 to shift the printing apparatus 100 from the non-operating state to the operating state.

As described above, a plurality of types of start programs can be stored in the fourth partition 7005 in which the data read/write speed is low, and a selected start program is transferred from the fourth partition 7005 to the first partition 7002. Once the start program is transferred from the fourth partition 7005 to the first partition 7002, it remains in the first partition 7002 even after power to the printing apparatus 100 is turned off. Thus, when executing the start program stored in the first partition 7002, it can be read out from the HDD 109 to the SDRAM 102 at a high speed.

In the first embodiment, a plurality of types of start programs is stored in the fourth partition 7005, and a selected start program is transferred from the fourth partition 7005 to the first partition 7002. However, the partition in which start programs are stored and the partition to which a selected start program is transferred is not limited to the above description, and any partitions can be used where the selected start program is moved to a partition located further outward from the partition the selected start program is currently is located in.

A second exemplary embodiment of the present invention will now be described.

In the first embodiment, a start program for starting the printing apparatus 100, from among a plurality of types of start programs, is transferred from the fourth partition 7005 to the first partition 7002.

In contrast, in the present embodiment, in addition to a selected start program, another type of file is also transferred from the fourth partition 7005 to the first partition 7002. For example, language files regarding the languages displayed on the operation panel 114 could be transferred along with the selected start program.

It is possible that the printing apparatus 100 can be used in more than one country, where the language in each of the countries is different. In order for the printing apparatus 100 to be used on a worldwide basis, the language displayed on the operation panel 114 would have to be changed to correspond to the particular language where the printing apparatus 100 is to be used. Accordingly, for example, only a language file associated with a country to which the printing apparatus 100 is to be shipped is stored in the HDD 109.

To accomplish this, the specifications of the printing apparatus 100, i.e., language files stored in the HDD 109, should be differentiated in accordance with the language systems. To eliminate such a complicated operation, a plurality of language files concerning all language systems that could be used in the printing apparatus 100 is stored in the HDD 109. The present embodiment realizes such a configuration of the HDD 109. In such a configuration, in order to obtain efficient performance, the language files would be stored in the area of the HDD 109 where the data read/write speed is high. Thus, in the present embodiment, a selected language file is stored in the first partition 7002.

Figure 8:
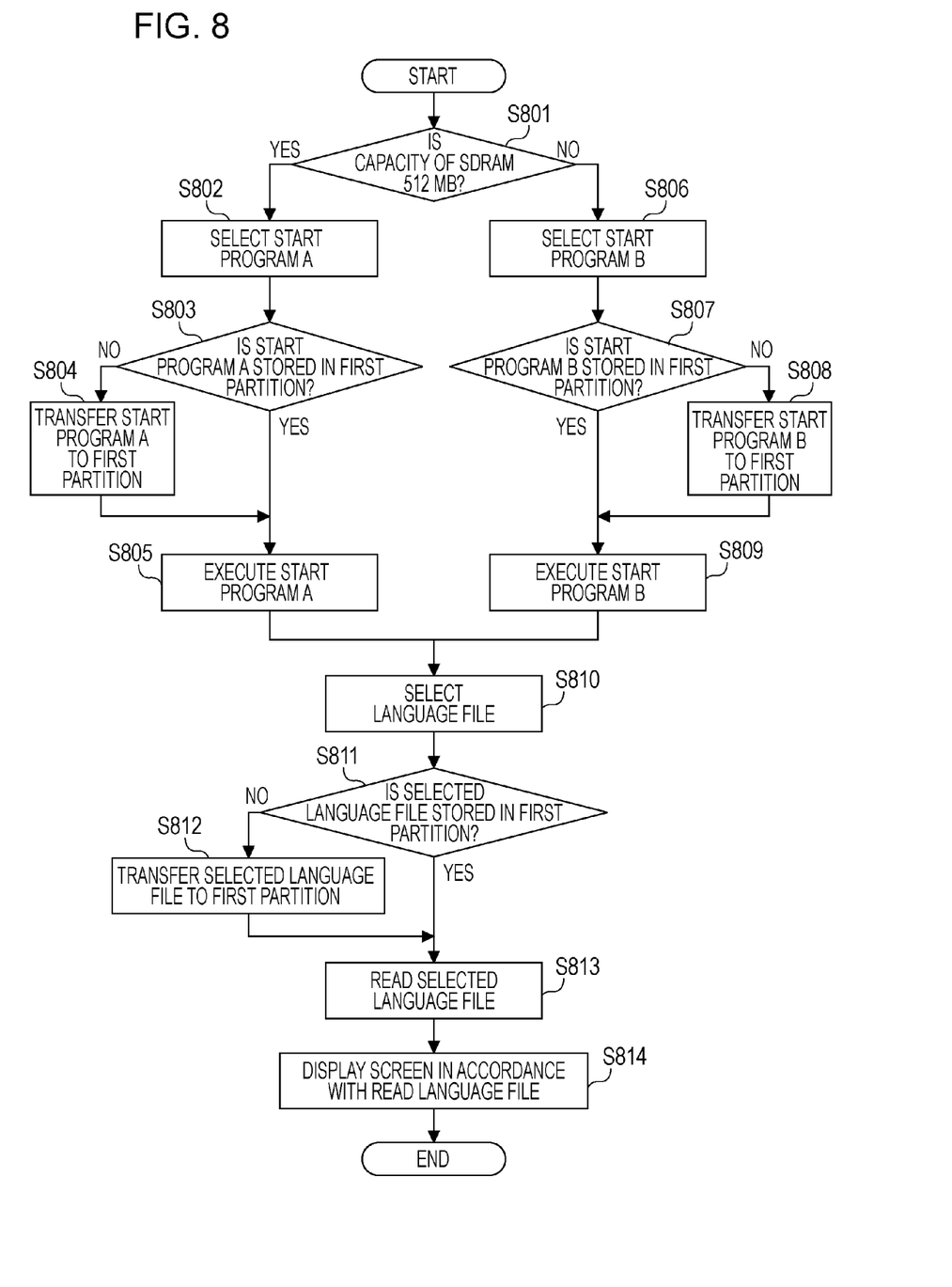
FIG. 8 is a flowchart illustrating an operation for selecting one of a plurality of types of language files.

FIG. 8 is a flowchart illustrating an operation for selecting one of a plurality of types of language files. Please note that while in the present embodiment language files are referred to, any other type of file, such as word processing, spreadsheet, etc., that would is applicable.

In FIG. 8, steps S801 through S809 are similar to steps S601 through S609 of FIG. 6, and as such, an explanation thereof is omitted herein. For description purposes, the language files are presumed to be stored in the fourth partition 7005 in advance.

In step S810, the CPU 103 selects one of the plurality of types of language files stored in the HDD 109. A language file to be used can be set by an operator of the printing apparatus 100 by using the operation panel 104. Thus, in step S810, the CPU 103 selects a language file by checking the language set by the operator.

In step S811, the CPU 103 determines whether the language file selected in step S810 is stored in the first partition 7002. If the selected language file is stored in the first partition 7002, the CPU 103 proceeds to step S813. If the selected language file is not stored in the first partition 7002, the CPU 103 proceeds to step S812.

In step S812, the CPU 103 transfers the language file from the fourth partition 7005 to the first partition 7002 since the selected language file is not stored in the first partition 7002. In step S813, the CPU 103 reads the language file stored in the first partition 7002 of the HDD 109. Then, in step S814, the CPU 103 displays an operation screen on the operation panel 114 by using the read language file.

As described above, language files are stored in the fourth partition 7005 in which the data read/write speed is low, and a selected language file is transferred from the fourth partition 7005 to the first partition 7002. Once the language file is transferred from the fourth partition 7005 to the first partition 7002, it remains in the first partition 7002 even after power to the printing apparatus 100 is turned off. Thus, fast readout of the language file can be implemented.

In the present embodiment, a plurality of types of language files are stored in the fourth partition 7005, and a selected language file used for displaying an operation screen is transferred from the fourth partition 7005 to the first partition 7002. However, the partition in which language files are stored and the partition to which a selected language file is transferred is not limited to the above description, and any partitions can be used where the selected language file is moved to a partition located further outward from the partition the selected language file is currently located in.

The present invention can also be achieved by supplying a storage medium in which software program code implementing the functions of the above-described exemplary embodiments of the invention is stored to a system or an apparatus. In this case, a computer of the system or the apparatus reads and executes the program code stored in the storage medium so that the functions of the first or second embodiment can be implemented. This means that the program code itself implements the functions of the above-described embodiments, and the storage medium storing the program code therein constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2006-173621 filed Jun. 23, 2006, which is hereby incorporated by reference herein in its entirety.

What is claimed is:

1. An information processing apparatus comprising:
    a first storage unit configured to include a first storage area and a second storage area and to store a plurality of types of start programs in the first storage area or the second storage area for shifting the information processing apparatus from a non-operating state to an operating state, the speed to readout information from the first storage area being faster than that of the second storage area;
    a second storage unit configured to receive a start program stored in the first storage area from the first storage unit and to store the received start program in the second storage unit;
    an executing unit configured to execute the start program stored in the second storage unit;
    a start program selecting unit configured to select a start program from among the plurality of types of start programs; and
    a controlling unit configured to control the first storage unit to store, in the first storage area, a start program selected by the start program selecting unit from among the plurality of types of start programs stored in the second storage area.

2. The information processing apparatus according to claim 1, wherein, if the start program selected by the start program selecting unit is already stored in the first storage area, the controlling unit does not transfer the selected start program from the second storage area to the first storage area, and if the start program selected by the start program selecting unit is not stored in the first storage area, the controlling unit transfers the selected start program from the second storage area to the first storage area.

3. The information processing apparatus according to claim 1, wherein the start program selecting unit selects a start program having a size that can be stored in the second storage unit from among the plurality of types of start programs.

4. The information processing apparatus according to claim 1, further comprising:
    a display unit configured to display operation screens associated with a plurality of types of languages; and
    a language file selecting unit configured to select one of the plurality of types of language files for displaying the operation screens associated with the plurality of types of languages,
    wherein the controlling unit controls the first storage unit to store, in the first storage area, a language file selected by the language file selecting unit from among the plurality of types of language files stored in the second storage area, reads the language file stored in the first storage area, and controls the display unit to display an operation screen associated with the read language file.

5. The information processing apparatus according to claim 4, wherein, if the language file selected by the language file selecting unit is already stored in the first storage area, the controlling unit does not transfer the selected language file from the second storage area to the first storage area, and if the language file selected by the language file selecting unit is not stored in the first storage area, the controlling unit transfers the selected language file from the second storage area to the first storage area.

6. The information processing apparatus according to claim 1, wherein the first storage unit is a non-volatile storage unit.

7. The information processing apparatus according to claim 6, wherein the first storage unit is a hard disk having a circular magnetic disk, wherein the first storage area is located further outward on the hard disk than the second storage area.

8. A method for controlling an information processing apparatus including a first storage unit that includes a first storage area and a second storage area and that stores a plurality of types of start programs in the first storage area or the second storage area for shifting the information processing apparatus from a non-operating state to an operating state, the speed to readout information from the first storage area being faster than that of the second storage area, and a second storage unit that receives a start program stored in the first storage area from the first storage unit and stores the received start program in the second storage unit, the method comprising:
    executing the start program stored in the second storage unit;
    selecting a start program from among the plurality of types of start programs; and
    controlling the first storage unit to store, in the first storage area, a start program selected from among the plurality of types of start programs stored in the second storage area.

9. The method according to claim 8, wherein, when controlling the first storage unit, if the selected start program is already stored in the first storage area, the selected start program is not transferred from the second storage area to the first storage area, and if the selected start program is not stored in the first storage area, the selected start program is transferred from the second storage area to the first storage area.

10. The method according to claim 8, wherein, when selecting a start program, a start program having a size that can be stored in the second storage unit is selected from among the plurality of types of start programs.

11. The method according to claim 8, wherein the information processing apparatus includes a display unit that displays operation screens associated with a plurality of types of languages, the method further comprising:

selecting one of the plurality of types of language files for displaying the operation screens associated with the plurality of types of languages, wherein, when controlling the first storage unit, the first storage unit is controlled to store, in the first storage area, the language file selected from among the plurality of types of language files stored in the second storage area and to read the language file stored in the first storage area so that an operation screen associated with the read language file is displayed on the display unit.

12. The control method according to claim 11, wherein, when controlling the first storage unit, if the selected language file is already stored in the first storage area, the selected language file is not transferred from the second storage area to the first storage area, and if the selected language file is not stored in the first storage area, the selected language file is transferred from the second storage area to the first storage area.

13. A computer-readable storage medium storing computer-executable process steps, the computer-executable process steps causing a computer to execute the method of claim 8.

14. The information processing apparatus according to claim 1, wherein the second storage unit receives the start program selected by the start program selecting unit and stored in the first storage area of the first storage unit from the first storage unit and stores the received start program.

15. The control method according to claim 8, wherein the second storage unit receives the start program selected and stored in the first storage area of the first storage unit from the first storage unit and stores the received start program.

* * * * *